United States Patent
Moore et al.

(10) Patent No.: US 12,269,169 B2
(45) Date of Patent: *Apr. 8, 2025

(54) SYSTEMS, METHODS, AND COMPUTER PROGRAM PRODUCTS FOR IMPLEMENTING OBJECT PERMANENCE IN A SIMULATED ENVIRONMENT

(71) Applicant: Sanctuary Cognitive Systems Corporation, Vancouver (CA)

(72) Inventors: Jonathan McCully Moore, Nanaimo (CA); Emma Amelia Fajeau, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,780

(22) Filed: Jul. 25, 2023

(65) Prior Publication Data

US 2024/0037848 A1 Feb. 1, 2024

Related U.S. Application Data

(60) Provisional application No. 63/392,621, filed on Jul. 27, 2022.

(51) Int. Cl.
| | |
|---|---|
| *B25J 9/16* | (2006.01) |
| *G06T 1/00* | (2006.01) |
| *G06T 7/20* | (2017.01) |
| *G06T 7/70* | (2017.01) |
| *G06T 17/05* | (2011.01) |

(52) U.S. Cl.
CPC ........... *B25J 9/1671* (2013.01); *B25J 9/1664* (2013.01); *G06T 1/0014* (2013.01); *G06T 7/20* (2013.01); *G06T 7/70* (2017.01); *G06T 17/05* (2013.01); *G06T 2215/16* (2013.01)

(58) Field of Classification Search
CPC ......... G06T 7/70; G06T 1/0014; B25J 9/1697
See application file for complete search history.

(56) References Cited

U.S. PATENT DOCUMENTS

| | | | |
|---|---|---|---|
| 11,691,274 B2* | 7/2023 | Kaehler | B25J 19/023 |
| | | | 700/245 |
| 2008/0246836 A1* | 10/2008 | Lowe | G06T 7/70 |
| | | | 348/E13.02 |
| 2020/0228774 A1* | 7/2020 | Kar | H04N 13/111 |
| 2021/0031364 A1* | 2/2021 | Groz | B25J 9/163 |
| 2021/0350625 A1* | 11/2021 | Robinson | G06F 3/011 |
| 2023/0039524 A1* | 2/2023 | Bhageria | B25J 9/161 |
| 2023/0245408 A1* | 8/2023 | Strandborg | G06V 10/764 |
| | | | 345/419 |

* cited by examiner

*Primary Examiner* — Jayanti K Patel
*Assistant Examiner* — Christopher Kingsbury Glover
(74) *Attorney, Agent, or Firm* — Thomas Mahon

(57) ABSTRACT

Systems, methods, and computer program products for managing simulated environments are described. A simulated environment is accessed which represents a physical environment, and representations of objects are included, maintained, or removed in the simulated environment based on whether objects are represented in image data of the physical environment, and based on whether objects are occluded by other objects in the image data of the physical environment. Future occlusion can also be predicted based on motion paths of objects.

15 Claims, 8 Drawing Sheets

SYSTEMS, METHODS, AND COMPUTER PROGRAM PRODUCTS FOR IMPLEMENTING OBJECT PERMANENCE IN A SIMULATED ENVIRONMENT

TECHNICAL FIELD

The present systems, methods and computer program products generally relate to managing simulated environments, and particularly relate to implementing object permeance in simulated environments.

DESCRIPTION OF THE RELATED ART

Simulated environments are useful in a variety of applications, including virtual or augmented reality, video games, and robotics, to name a few examples. Robots are machines that may be deployed to perform work. General purpose robots (GPRs) can be deployed in a variety of different environments, to achieve a variety of objectives or perform a variety of tasks. Robots can utilize simulated environment to operate within a physical environment. Such simulated environments should be as robust as possible through effective and selective updating of the environment models, to provide information that results in optimal performance in a given environment.

BRIEF SUMMARY

According to a broad aspect, the present disclosure describes a method of managing a simulated environment, the method comprising: accessing, by at least one processor, the simulated environment, wherein the simulated environment comprises an environment model representing a physical environment; capturing, by at least one image sensor, first image data representing the physical environment at a first time, the first image data further representing a first object at a first position; including, in the environment model, a first representation of the first object based on the first image data; capturing, by the at least one image sensor, second image data representing the physical environment at a second time after the first time; determining, by the at least one processor, whether the first object is represented in the second image data; if the first object is represented in the second image data, maintaining representation of the first object in the environment model; if the first object is not represented in the second image data: determining, by the at least one processor, whether the first object is occluded from the second image data by at least one second object at the second time; if the first object is occluded from the second image data by the at least one second object at the second time: maintaining representation of the first object in the environment model; if the first object is not occluded from the second image data by the at least one second object at the second time: removing representation of the first object from the environment model.

Managing a simulated environment may include implementing object permanence in the simulated environment.

Including, in the environment model, a first representation of the first object based on the first image data may comprise: populating, by the at least one processor, the environment model with the first representation of the first object based on the first image data.

Including, in the environment model, a first representation of the first object based on the first image data may comprise: determining, by the at least one processor, whether the environment model includes the first representation of the first object; if the environment model includes the first representation of the first object, preserving the first representation of the first object as included in the environment model; and if the environment model does not include the first representation of the first object, populating the environment model with the first representation of the first object based on the first image data.

Determining whether the first object is occluded from the second image data by the at least one second object at the second time may comprise: identifying a second position of the at least one second object at the second time; and determining, by the at least one processor, whether the second position of the at least one second object is between the first position of the first object at the first time and a position of the image sensor at the second time.

The at least one image sensor may be carried by a robot body positioned in the physical environment. The at least one second object may include at least one member of the robot body. The at least one member of the robot body may include at least one end-effector of the robot body. The at least one end-effector of the robot body may include at least one hand member of the robot body. Determining whether the first object is occluded from the second image data by the at least one second object at the second time may comprise: identifying, at a third time before the second time, a motion path of the at least one member of the robot body; determining, by the at least one processor before the second time, a predicted position of the at least one member of the robot body at the second time based on the identified motion path; and determining whether the predicted position of the at least one member of the robot body is between the first position of the first object at the first time and a position of the image sensor. Identifying the motion path of the at least one member of the robot body may comprise: identifying the motion path of the at least one member of the robot body by simulating, by the at least one processor, a trajectory of the at least one member of the robot body based on speed and direction of travel of the at least one member of the robot body. The speed and direction of travel of the at least one member of the robot body may be identified based on haptic data captured by at least one haptic sensor carried by the robot body. The speed and direction of travel of the at least one member of the robot body may be identified based on image data from the at least one image sensor. Identifying the motion path of the at least one member of the robot body may comprise: identifying the motion path of the at least one member of the robot body based on at least one motion instruction upon which movement of the at least one member of the robot body is based.

Determining, by the at least one processor, whether the first object is represented in the second image data may comprise: determining that the first object is not represented in the second image data.

According to another broad aspect, the present disclosure describes a system comprising: at least one image sensor; at least one processor; and at least one non-transitory processor-readable storage medium communicatively coupled to the at least one processor, the at least one non-transitory processor-readable storage medium storing processor executable instructions and/or data that, when executed by the at least one processor, cause the system to: access, by the at least one processor, a simulated environment, wherein the simulated environment comprises an environment model representing a physical environment; capture, by the at least one image sensor, first image data representing the physical environment at a first time, the first image data further representing a first object at a first position; include, in the environment model, a first representation of the first object based on the first image data; capture, by the at least one image sensor, second image data representing the physical environment at a second time after the first time; determine, by the at least one processor, whether the first object is represented in the second image data; if the first object is represented in the second image data, maintain representation of the first object in the environment model; if the first object is not represented in the second image data: determine, by the at least one processor, whether the first object is occluded from the second image data by at least one second object at the second time; if the first object is occluded from the second image data by the at least one second object at the second time: maintain representation of the first object in the environment model; if the first object is not occluded from the second image data by the at least one second object at the second time: remove representation of the first object from the environment model.

The processor-executable instructions and/or data which cause the system to include, in the environment model, a first representation of the first object based on the first image data may cause the system to: populate, by the at least one processor, the environment model with the first representation of the first object based on the first image data.

The processor-executable instructions and/or data which cause the system to include, in the environment model, a first representation of the first object based on the first image data may cause the system to: determine, by the at least one processor, whether the environment model includes the first representation of the first object; if the environment model includes the first representation of the first object, preserve the first representation of the first object as included in the environment model; and if the environment model does not include the first representation of the first object, populate the environment model with the first representation of the first object based on the first image data.

The processor-executable instructions and/or data which cause the system to determine whether the first object is occluded from the second image data by the at least one second object at the second time may cause the system to: identify a second position of the at least one second object at the second time; determine, by the at least one processor, whether the second position of the at least one second object is between the first position of the first object at the first time and a position of the image sensor at the second time.

The system may further comprise a robot body, and the at least one image sensor may be carried by the robot body. The at least one second object may include at least one member of the robot body. The at least one member of the robot body may include at least one end-effector of the robot body. The at least one end-effector of the robot body may include at least one hand member of the robot body. The processor-executable instructions and/or data which cause the system to determine whether the first object is occluded from the second image data by the at least one second object at the second time may cause the system to: identify, at a third time before the second time, a motion path of the at least one member of the robot body; determine, by the at least one processor before the second time, a predicted position of the at least one member of the robot body at the second time based on the identified motion path; and determine whether the predicted position of the at least one member of the robot body is between the first position of the first object at the first time and a position of the image sensor. The processor-executable instructions and/or data which cause the system to identify the motion path of the at least one member of the robot body may cause the system to: identify the motion path of the at least one member of the robot body by simulating, by the at least one processor, a trajectory of the at least one member of the robot body based on speed and direction of travel of the at least one member of the robot body. The system may further comprise at least one haptic sensor carried by the robot body, and the speed and direction of travel of the at least one member of the robot body may be identified based on haptic data captured by the at least one haptic sensor. The speed and direction of travel of the at least one member of the robot body may be identified based on image data from the at least one image sensor. The processor-executable instructions and/or data which cause the system to identify the motion path of the at least one member of the robot body may cause the system to: identify the motion path of the at least one member of the robot body based on at least one motion instruction upon which movement of the at least one member of the robot body is based.

The at least one processor may be carried by the robot body. The at least one non-transitory processor-readable storage medium may be carried by the robot body, and the simulated environment including the environment model may be stored on the at least one non-transitory processor-readable storage medium carried by the robot body. The system may further comprise at least one device remote from the robot body; the at least one non-transitory processor-readable storage medium may include at least one first non-transitory processor-readable storage medium at the remote device; and the simulated environment including the environment model may be stored on the at least one first non-transitory processor-readable storage medium at the remote device.

The processor-executable instructions and/or data which cause the system to determine, by the at least one processor, whether the first object is represented in the second image data may cause the system to: determine that the first object is not represented in the second image data.

According to yet another broad aspect, the present disclosure describes a computer program product comprising a non-transitory processor-readable storage medium storing processor-executable instructions and/or data that, when executed by at least one processor of a processor-based system, cause the processor-based system to: access, by the at least one processor, a simulated environment, wherein the simulated environment comprises an environment model representing a physical environment; capture, by at least one image sensor, first image data representing the physical environment at a first time, the first image data further representing a first object at a first position; include, in the environment model, a first representation of the first object based on the first image data; capture, by the at least one image sensor, second image data representing the physical environment at a second time after the first time; determine, by the at least one processor, whether the first object is represented in the second image data; if the first object is represented in the second image data, maintain representation of the first object in the environment model; if the first object is not represented in the second image data: determine, by the at least one processor, whether the first object is occluded from the second image data by at least one second object at the second time; if the first object is occluded from the second image data by the at least one second object at the second time: maintain representation of the first object in the environment model; if the first object is not occluded from the second image data by the at least one second object at the second time: remove representation of the first object from the environment model.

The processor-executable instructions and/or data which cause the processor-based system to include, in the environment model, a first representation of the first object based on the first image data may cause the processor-based system to: populate, by the at least one processor, the environment model with the first representation of the first object based on the first image data.

The processor-executable instructions and/or data which cause the processor-based system to include, in the environment model, a first representation of the first object based on the first image data may cause the processor-based system to: determine, by the at least one processor, whether the environment model includes the first representation of the first object; if the environment model includes the first representation of the first object, preserve the first representation of the first object as included in the environment model; and if the environment model does not include the first representation of the first object, populate the environment model with the first representation of the first object based on the first image data.

The processor-executable instructions and/or data which cause the processor-based system to determine whether the first object is occluded from the second image data by the at least one second object at the second time may cause the processor-based system to: identify a second position of the at least one second object at the second time; and determine, by the at least one processor, whether the second position of the at least one second object is between the first position of the first object at the first time and a position of the image sensor at the second time.

The processor-based system may comprise a robot body, and the at least one image sensor may be carried by the robot body. The at least one second object may include at least one member of the robot body. The at least one member of the robot body may include at least one end-effector of the robot body. The at least one end-effector of the robot body may include at least one hand member of the robot body. The processor-executable instructions and/or data which cause the processor-based system to determine whether the first object is occluded from the second image data by the at least one second object at the second time may cause the processor-based system to: identify, at a third time before the second time, a motion path of the at least one member of the robot body; determine, by the at least one processor before the second time, a predicted position of the at least one member of the robot body at the second time based on the identified motion path; and determine whether the predicted position of the at least one member of the robot body is between the first position of the first object at the first time and a position of the image sensor. The processor-executable instructions and/or data which cause the processor-based system to identify the motion path of the at least one member of the robot body may cause the processor-based system to: identify the motion path of the at least one member of the robot body by simulating, by the at least one processor, a trajectory of the at least one member of the robot body based on speed and direction of travel of the at least one member of the robot body. The robot body may further carry at least one haptic sensor, and the speed and direction of travel of the at least one member of the robot body may be identified based on haptic data captured by the at least one haptic sensor. The speed and direction of travel of the at least one member of the robot body may be identified based on image data from the at least one image sensor. The processor-executable instructions and/or data which cause the processor-based system to identify the motion path of the at least one member of the robot body may cause the processor-based system to: identify the motion path of the at least one member of the robot body based on at least one motion instruction upon which movement of the at least one member of the robot body is based.

The at least one processor may be carried by the robot body. The at least one non-transitory processor-readable storage medium may be carried by the robot body, and the simulated environment including the environment model may be stored on the at least one non-transitory processor-readable storage medium carried by the robot body. The processor-based system may further include at least one device remote from the robot body; the at least one non-transitory processor-readable storage medium may include at least one first non-transitory processor-readable storage medium at the remote device; and the simulated environment including the environment model may be stored on the at least one first non-transitory processor-readable storage medium at the remote device. The processor-executable instructions and/or data which cause the processor-based system to determine, by the at least one processor, whether the first object is represented in the second image data may cause the processor-based system to: determine that the first object is not represented in the second image data.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

The following description sets forth specific details in order to illustrate and provide an understanding of the various implementations and embodiments of the present systems, methods, and computer program products. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, methods, and computer program products.

Figure 1:
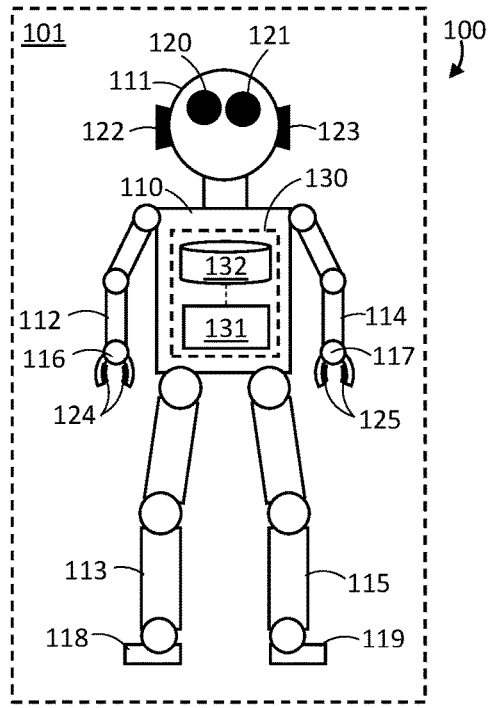
FIGS. 1, 2, and 3 are respective illustrative diagrams of exemplary robot systems comprising various features and components described throughout the present systems, methods, and computer program products.

FIG. 1 is a front view of an exemplary robot system 100 in accordance with one implementation. In the illustrated example, robot system 100 includes a robot body 101 that is designed to approximate human anatomy, including a torso 110 coupled to a plurality of components including head 111, right arm 112, right leg 113, left arm 114, left leg 115, right end-effector 116, left end-effector 117, right foot 118, and left foot 119, which approximate anatomical features. More or fewer anatomical features could be included as appropriate for a given application. Further, how closely a robot approximates human anatomy can also be selected as appropriate for a given application.

Each of components 110, 111, 112, 113, 114, 115, 116, 117, 118, and 119 can be actuatable relative to other components. Any of these components which is actuatable relative to other components can be called an actuatable member. Actuators, motors, or other movement devices can couple together actuatable components. Driving said actuators, motors, or other movement driving mechanism causes actuation of the actuatable components. For example, rigid limbs in a humanoid robot can be coupled by motorized joints, where actuation of the rigid limbs is achieved by driving movement in the motorized joints.

Figure 4A:
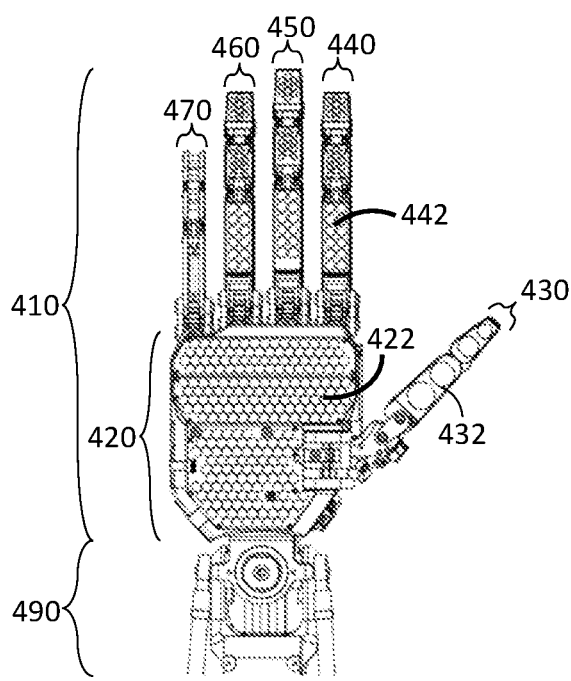
FIGS. 4A, 4B, and 4C are respective views of a hand-shaped member having tactile or haptic sensors thereon.
Figure 4B:
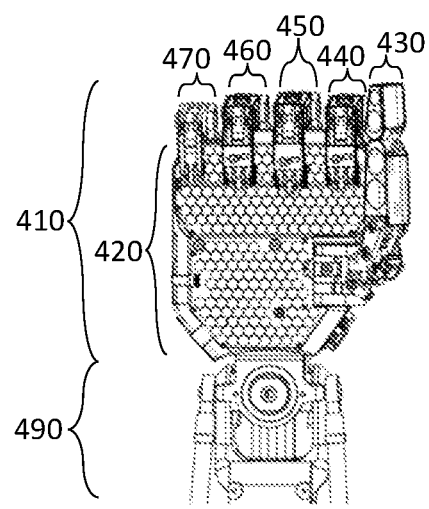
Figure 4C:
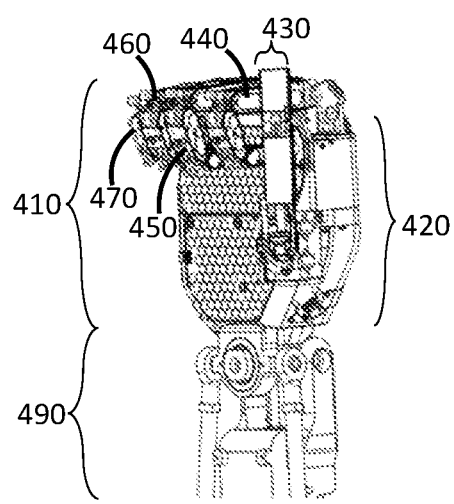

End effectors 116 and 117 are shown in FIG. 1 as grippers, but any end effector could be used as appropriate for a given application. FIGS. 4A, 4B, and 4C illustrate an exemplary case where the end effectors can be hand-shaped members.

Figure 2:
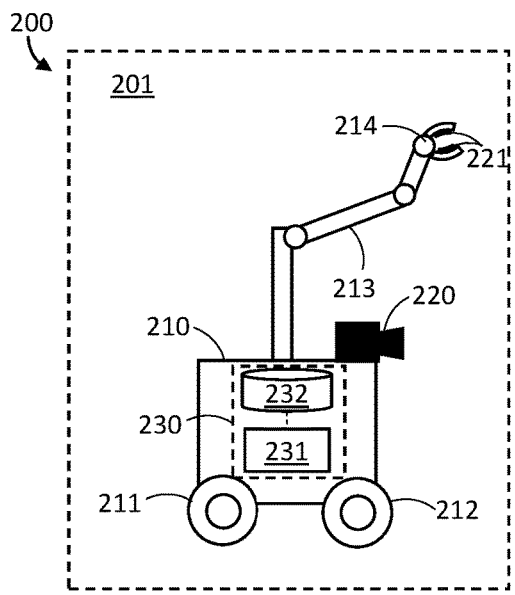

Right leg 113 and right foot 118 can together be considered as a support member and/or a locomotion member, in that the leg 113 and foot 118 together can support robot body 101 in place, or can move in order to move robot body 101 in an environment (i.e. cause robot body 101 to engage in locomotion). Left leg 115 and left foot 119 can similarly be considered as a support member and/or a locomotion member. Legs 113 and 115, and feet 118 and 119 are exemplary support and/or locomotion members, and could be substituted with any support members or locomotion members as appropriate for a given application. For example, FIG. 2 illustrates wheels as exemplary locomotion members instead of legs and feet.

Robot system 100 in FIG. 1 includes a robot body 101 that closely approximates human anatomy, such that input to or control of robot system 100 can be provided by an operator performing an action, to be replicated by the robot body 101 (e.g. via a tele-operation suit or equipment). In some implementations, it is possible to even more closely approximate human anatomy, such as by inclusion of actuatable components in a face on the head 111 of robot body 101, or with more detailed design of hands or feet of robot body 101, as non-limiting examples. However, in other implementations a complete approximation of the human anatomy is not required, and a robot body may only approximate a portion of human anatomy. As non-limiting examples, only an arm of human anatomy, only a head or face of human anatomy; or only a leg of human anatomy could be approximated.

Robot system 100 is also shown as including sensors 120, 121, 122, 123, 124, and 125 which collect context data representing an environment of robot body 101. In the example, sensors 120 and 121 are image sensors (e.g. cameras) that capture visual data representing an environment of robot body 101. Although two image sensors 120 and 121 are illustrated, more or fewer image sensors could be included. Also in the example, sensors 122 and 123 are audio sensors (e.g. microphones) that capture audio data representing an environment of robot body 101. Although two audio sensors 122 and 123 are illustrated, more or fewer audio sensors could be included. In the example, haptic (tactile) sensors 124 are included on end effector 116, and haptic (tactile) sensors 125 are included on end effector 117. Haptic sensors 124 and 125 can capture haptic data (or tactile data) when objects in an environment are toughed or grasped by end effectors 116 or 117. Haptic or tactile sensors could also be included on other areas or surfaces of robot body 101. Three types of sensors are illustrated in the example of FIG. 1, though more or fewer sensor types could be included. For example, audio sensors may not be included. As another example, other sensor types, such as accelerometers, inertial sensors, gyroscopes, temperature sensors, humidity sensors, pressure sensor, radiation sensors, or any other appropriate types of sensors could be included. Further, although sensors 120 and 121 are shown as approximating human eyes, and sensors 122 and 123 are shown as approximating human ears, sensors 120, 121, 122, and 123 could be positioned in any appropriate locations and have any appropriate shape.

Throughout this disclosure, reference is made to "haptic" sensors, "haptic" feedback, and "haptic" data. Herein, "haptic" is intended to encompass all forms of touch, physical contact, or feedback. This can include (and be limited to, if appropriate) "tactile" concepts, such as texture or feel as can be measured by a tactile sensor. "Haptic" can also include (and be limited to, if appropriate), force-related aspects of touch, such as force-feedback, resilience, or weight of an element, as could be measured by torque or force sensor of an actuatable member which causes touching of the element. "Haptic" can also include (and be limited to, if appropriate) "proprioceptive" aspects of touch, such as kinesthesia, motion, rotation, or inertial effects experienced when a member of a robot touches an element, as can be measured by sensors such as an Inertial measurement unit (IMU), and accelerometer, a gyroscope, or any other appropriate sensor.

Robot system 100 is also illustrated as including at least one processor 131, communicatively coupled to at least one non-transitory processor-readable storage medium 132. The at least one processor 131 can control actuation of components 110, 111, 112, 113, 114, 115, 116, 117, 118, and 119; can receive and process data from sensors 120, 121, 122, 123, 124, and 125; can determine context of the robot body 101, and can access, construct, or refine an environment model, among other possibilities. The at least one non-transitory processor-readable storage medium 132 can have processor-executable instructions or data stored thereon, which when executed by the at least one processor 131 can cause robot system 100 to perform any of the methods discussed herein. Further, the at least one non-transitory processor-readable storage medium 132 can store sensor data, classifiers, or any other data as appropriate for a given application. Further still, the at least one non-transitory processor-readable storage medium 132 can store environment models, such as that discussed later with reference to FIG. 5B. The at least one processor 131 and the at least one processor-readable storage medium 132 together can be considered as components of a "robot controller" 130, in that they control operation of robot system 100 in some capacity. While the at least one processor 131 and the at least one processor-readable storage medium 132 can perform all of the respective functions described in this paragraph, this is not necessarily the case, and the "robot controller" 130 can be or further include components that are remote from robot body 101. In particular, certain functions can be performed by at least one processor or at least one non-transitory processor-readable storage medium remote from robot body 101, as discussed later with reference to FIG. 3.

In some implementations, it is possible for a robot body to not approximate human anatomy. FIG. 2 is an elevated side view of a robot system 200 including a robot body 201 which does not approximate human anatomy. Robot body 201 includes a base 210, having actuatable components 211, 212, 213, and 214 coupled thereto. In the example, actuatable components 211 and 212 are wheels (locomotion members) which support robot body 201, and provide movement or locomotion capabilities to the robot body 201. Actuatable components 213 and 214 are a support arm and an end effector, respectively. The description for end effectors 116 and 117 in FIG. 1 is applicable to end effector 214 in FIG. 2. End effector 214 can also take other forms, such as a hand-shaped member as discussed later with reference to FIGS. 4A, 4B, and 4C. In other examples, other actuatable components could be included.

Robot system 200 also includes sensor 220, which is illustrated as an image sensor. Robot system 200 also includes a haptic sensor 221 positioned on end effector 214. The description pertaining to sensors 120, 121, 122, 123, 124, and 125 in FIG. 1 is also applicable to sensors 220 and 221 in FIG. 2 (and is applicable to inclusion of sensors in robot bodies in general). End effector 214 can be used to touch, grasp, or manipulate objects in an environment. Further, any number of end effectors could be included in robot system 200 as appropriate for a given application or implementation.

Robot system 200 is also illustrated as including a local or on-board robot controller 230 comprising at least one processor 231 communicatively coupled to at least one non-transitory processor-readable storage medium 232. The at least one processor 231 can control actuation of components 210, 211, 212, 213, and 214; can receive and process data from sensors 220 and 221; and can determine context of the robot body 201 and can access, construct, or refine an environment model, among other possibilities. The at least one non-transitory processor-readable storage medium 232 can store processor-executable instructions or data that, when executed by the at least one processor 231, can cause robot body 201 to perform any of the methods discussed herein. Further, the at least one processor-readable storage medium 232 can store sensor data, classifiers, or any other data as appropriate for a given application. Further still, the at least one non-transitory processor-readable storage medium 232 can store environment models, such as that discussed later with reference to FIG. 5B.

Figure 3:
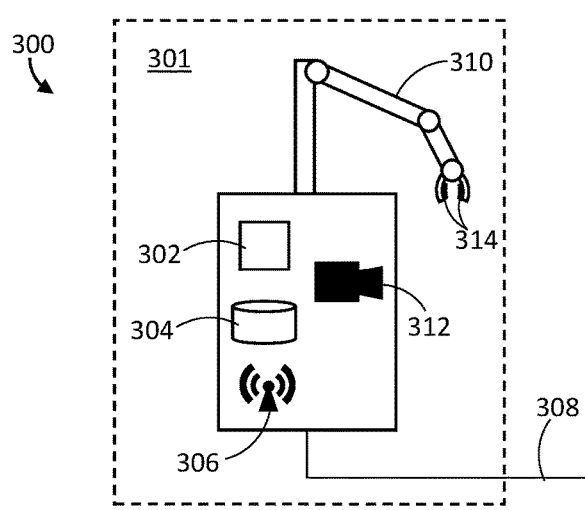
Figure 3:
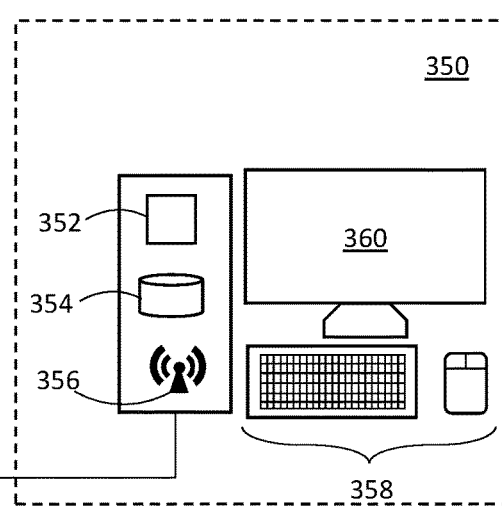

FIG. 3 is a schematic diagram illustrating components of a robot system 300 comprising a robot body 301 and a physically separate remote device 350 in accordance with the present robots and methods.

Robot body 301 is shown as including at least one local or on-board processor 302, a non-transitory processor-readable storage medium 304 communicatively coupled to the at least one processor 302, a wireless communication interface 306, a wired communication interface 308, at least one actuatable component 310, at least one sensor 312, and at least one haptic sensor 314. However, certain components could be omitted or substituted, or elements could be added, as appropriate for a given application. As an example, in many implementations only one communication interface is needed, so robot body 301 may include only one of wireless communication interface 306 or wired communication interface 308. Further, any appropriate structure of at least one actuatable portion could be implemented as the actuatable component 310 (such as those shown in FIGS. 1 and 2, for example). For example, robot body 101 as described with reference to FIG. 1, or robot body 201 described with reference to FIG. 2, could be used in place of robot body 301, and communication interface 306 or communication interface 308 could be implemented therein to enable communication with remote device 350. Further still, the at least one sensor 312 and the at least one haptic sensor 314 can include any appropriate quantity or type of sensor, as discussed with reference to FIGS. 1 and 2.

Remote device 350 is shown as including at least one processor 352, at least one non-transitory processor-readable medium 354, a wireless communication interface 356, a wired communication interface 308, at least one input device 358, and an output device 360. However, certain components could be omitted or substituted, or elements could be added, as appropriate for a given application. As an example, in many implementations only one communication interface is needed, so remote device 350 may include only one of wireless communication interface 356 or wired communication interface 308. As another example, input device 358 can receive input from an operator of remote device 350, and output device 360 can provide information to the operator, but these components are not essential in all implementations. For example, remote device 350 can be a server which communicates with robot body 301, but does not require operator interaction to function. Additionally, output device 360 is illustrated as a display, but other output devices are possible, such as speakers, as a non-limiting example. Similarly, the at least one input device 358 is illustrated as a keyboard and mouse, but other input devices are possible.

In some implementations, the at least one processor 302 and the at least one processor-readable storage medium 304 together can be considered as a "robot controller", which controls operation of robot body 301. In other implementations, the at least one processor 352 and the at least one processor-readable storage medium 354 together can be considered as a "robot controller" which controls operation of robot body 301 remotely. In yet other implementations, that at least one processor 302, the at least one processor 352, the at least one non-transitory processor-readable storage medium 304, and the at least one processor-readable storage medium 354 together can be considered as a "robot controller" (distributed across multiple devices) which controls operation of robot body 301. "Controls operation of robot body 301" refers to the robot controller's ability to provide instructions or data for operation of the robot body 301 to the robot body 301. In some implementations, such instructions could be explicit instructions which control specific actions of the robot body 301. In other implementations, such instructions or data could include broader instructions or data which guide the robot body 301 generally, where specific actions of the robot body 301 are controlled by a control unit of the robot body 301 (e.g. the at least one processor 302), which converts the broad instructions or data to specific action instructions. In some implementations, a single remote device 350 may communicatively link to and at least partially control multiple (i.e., more than one) robot bodies. That is, a single remote device 350 may serve as (at least a portion of) the respective robot controller for multiple physically separate robot bodies 301.

FIGS. 1, 2, and 3 each illustrate robot bodies having at least one haptic sensor (sensors 124 and 125 in FIG. 1, sensor 221 in FIG. 2, and sensor 314 in FIG. 3). However, such haptic sensors are not necessarily required, and can be omitted in some implementations.

FIGS. 4A, 4B, and 4C illustrate an exemplary end effector 410 coupled to a member 490 of a robot body. Member 490 could be, for example, an arm of robot body 101, 201, or 301 in FIG. 1, 2, or 3. As a specific example, member 490 could correspond to arm 112 or arm 114 in robot body 101 in FIG. 1. In the illustrated example, end effector 410 is hand-shaped, to grasp, grip, handle, manipulate, touch, or release objects similar to how a human hand would. In the illustrated example, end effector 410 includes finger-shaped members 430, 440, 450, 460, and 470. Although five finger-shaped members are illustrated, any number of finger-shaped members could be included as appropriate for a given application. Each of finger-shaped members 430, 440, 450, 460, and 470 are coupled to a palm-shaped member 420. Palm-shaped member 420 serves as a common member to which the finger-shaped members are coupled. In the example, each of finger-shaped members 430, 440, 450, 460, and 470 are actuatable relative to the palm-shaped member 420 at a respective joint. The finger-shaped members can also include joints at which sub-members of a given finger-shaped member are actuatable. A finger-shaped member can include any number of sub-members and joints, as appropriate for a given application.

In some implementations, the end effectors and/or hands described herein, including but not limited to hand 410, may incorporate any or all of the teachings described in U.S. patent application Ser. No. 17/491,577, U.S. patent application Ser. No. 17/749,536, and/or U.S. patent application Ser. No. 18/197,915, each of which is incorporated herein by reference in its entirety.

Although joints are not explicitly labelled in FIGS. 4A, 4B, and 4C to avoid clutter, the location of such joints can be understood based on the different poses of end-effector 410 shown in FIGS. 4A, 4B, and 4C. FIG. 4A is a front-view which illustrates end effector 410 in an open configuration, with finger-shaped members 430, 440, 450, 460, and 470 extended from palm-shaped member 420 (for example to receive or touch an object). FIG. 4B is a front view which illustrates end effector 410 in a closed configuration, with finger-shaped members 430, 440, 450, 460, and 470 closed into palm-shaped member 420 (for example to grasp or grip an object). FIG. 4C is an isometric view which illustrates end effector 410 in the closed configuration as in FIG. 4B. The closed configuration of FIGS. 4B and 4C can also be called a contracted configuration, in that finger-shaped members 430, 440, 450, 460, and 470 are "contracted" inward relative to each other. The closed configuration can also be referred to as a grasp configuration, used for grasping an object.

Additionally, FIGS. 4A, 4B, and 4C illustrate a plurality of tactile sensors 422, 432, and 442 on respective palm-shaped member 420 and finger-shaped members 430 and 440. Similar tactile sensors are optionally included on finger-shaped members 450 and 460 which are not labelled to avoid clutter. Finger-shaped member 470 is illustrated without tactile sensors thereon, which is indicative that in some implementations a hand-shaped member may be only partially covered by tactile sensors (although full cover by tactile sensors is possible in other implementations). Such tactile sensors can collect tactile data. Further, these "tactile" sensors can also be referred to as "haptic" sensors, in that they collect data relating to touch, which is included in haptic data as discussed earlier.

Figure 5A:
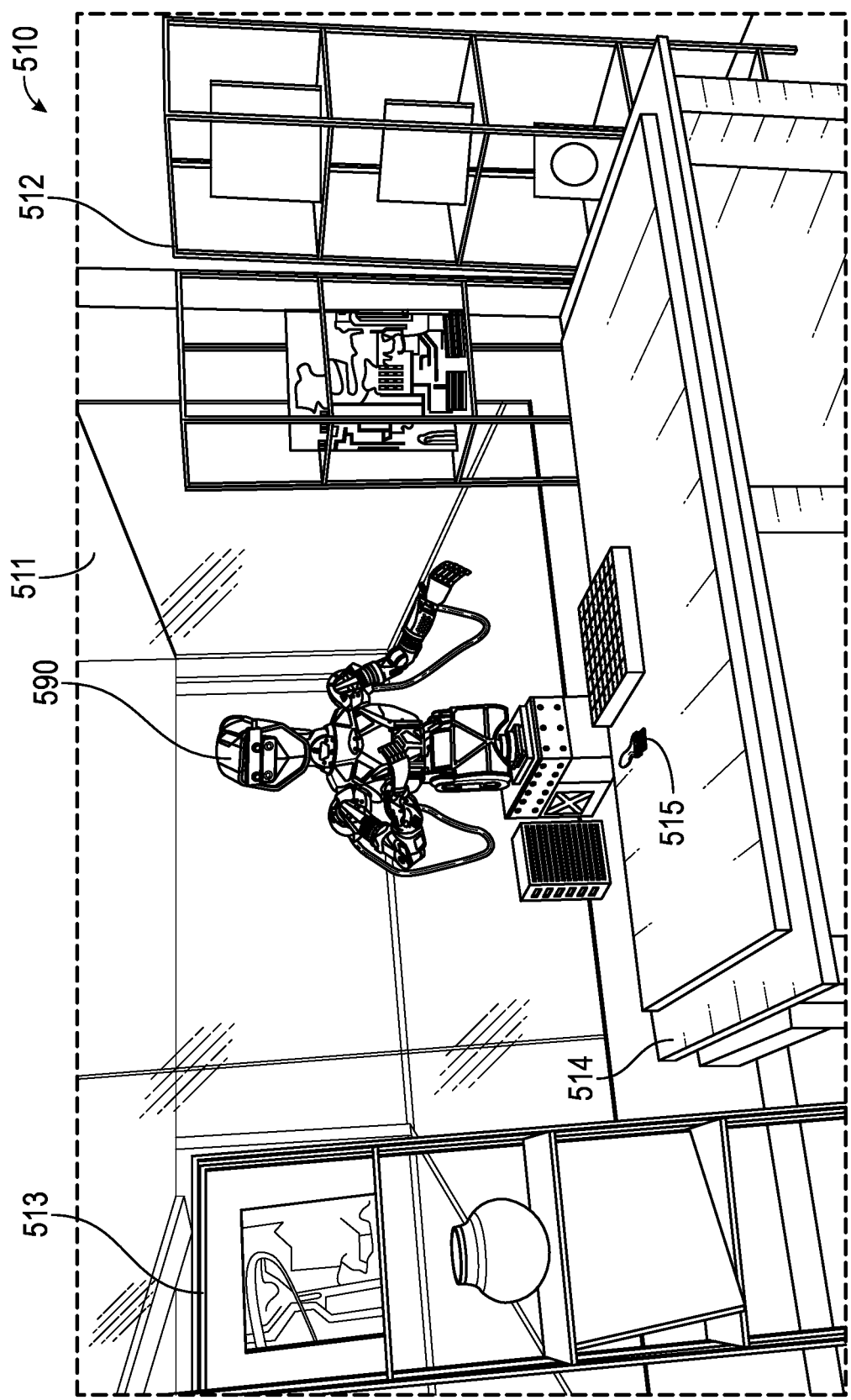
FIG. 5A is a scene view of an environment in which a robot body is positioned.

FIG. 5A is a scene view which illustrates an exemplary physical (real-world) environment 510 in which a real physical robot body 590 is positioned. Environment 510 includes at least display 511 behind robot body 590, shelving units 512 and 513 to the sides of robot body 590, a table 514 in front of robot body 590, and a brush 515 on table 514. This does not describe every feature or element illustrated in environment 510, but rather describes some prominent features to provide insight into what is shown in FIG. 5A.

Figure 5B:
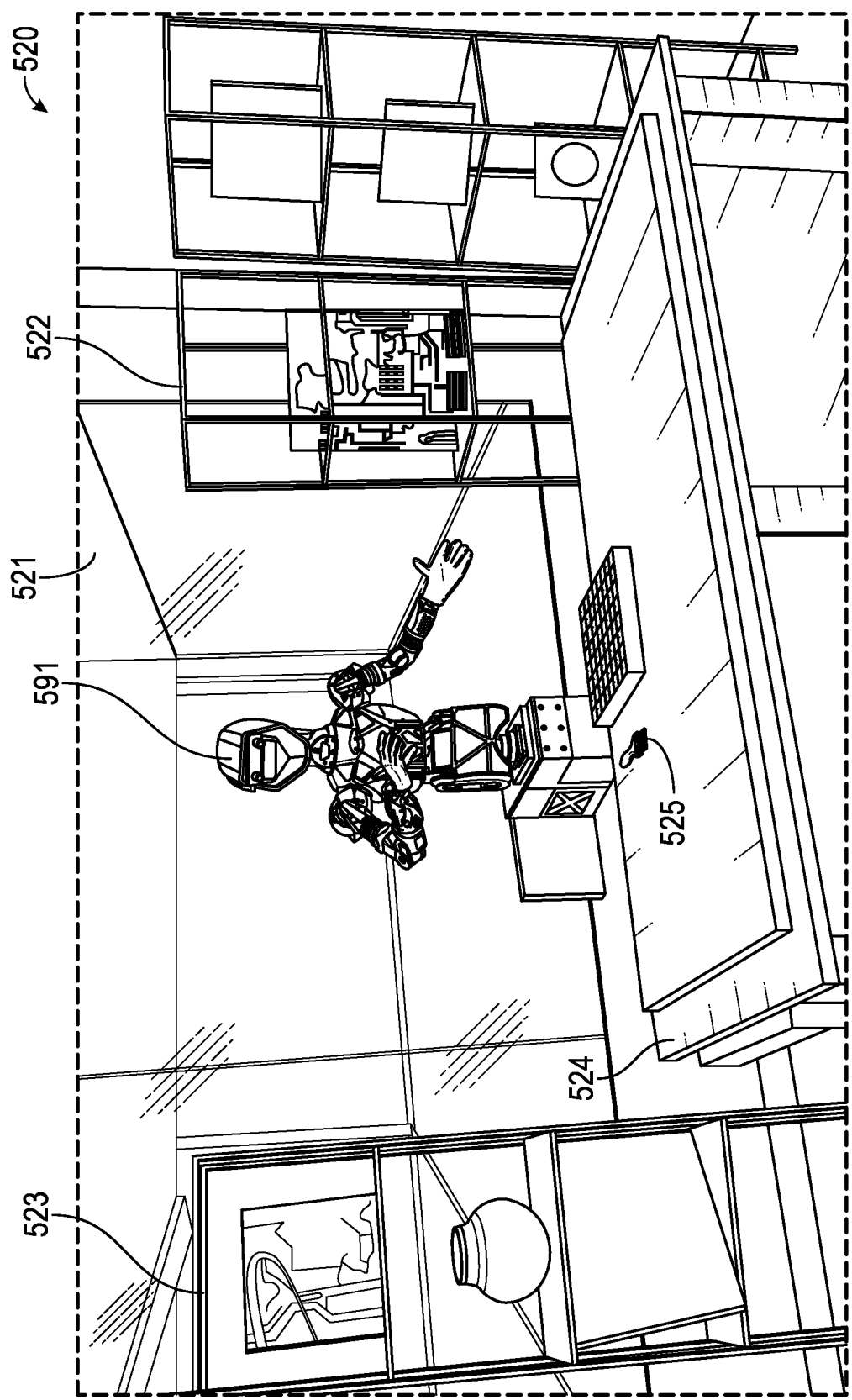
FIG. 5B is a scene view of an environment model which represents the environment shown in FIG. 5A.

FIG. 5B is a scene view which illustrates a virtual environment model 520 which represents real-world environment 510 in FIG. 5A. Environment model 520 includes representation 591, which is a virtual model of robot 590 in FIG. 5A. Environment model 520 includes representation 521 of display 511 behind representation 591 of robot body 590, representations 522 and 523 of shelving units 512 and 513 to the sides of representation 591 of robot body 590, representation 524 of table 514 in front of representation 591 of robot body 590, and representation 525 of brush 515 on representation 524 of table 514. Environment model 520 can include a visually rendered representation 591 of robot body 590, such that when robot body 590 is operated at least partially based on environment model 520, robot body 590 can be "seen" as representation 591 in environment model 520. Alternatively, environment model 520 can specify representation 591 as a spatial representation of robot body 590 (even if not visually rendered) where elements in the environment model 520 are specified relative to a position of representation 591 of robot body 590. In this way representation 591 of robot body 590 may not be visually "seen" as representation 591, but locations of elements relative to the position of representation 591 can still be understood.

FIGS. 5A and 5B visually illustrate an environment model representing an environment, and such a model can be constructed, generated, populated, and/or refined based on visual data (e.g. from at least one image sensor of robot body 590, or from at least one image sensor of another device or robot). Objects, elements, or features in the environment could be represented and stored in an environment model for example based on coordinates and/or size of said objects, elements, or features.

Figure 6:
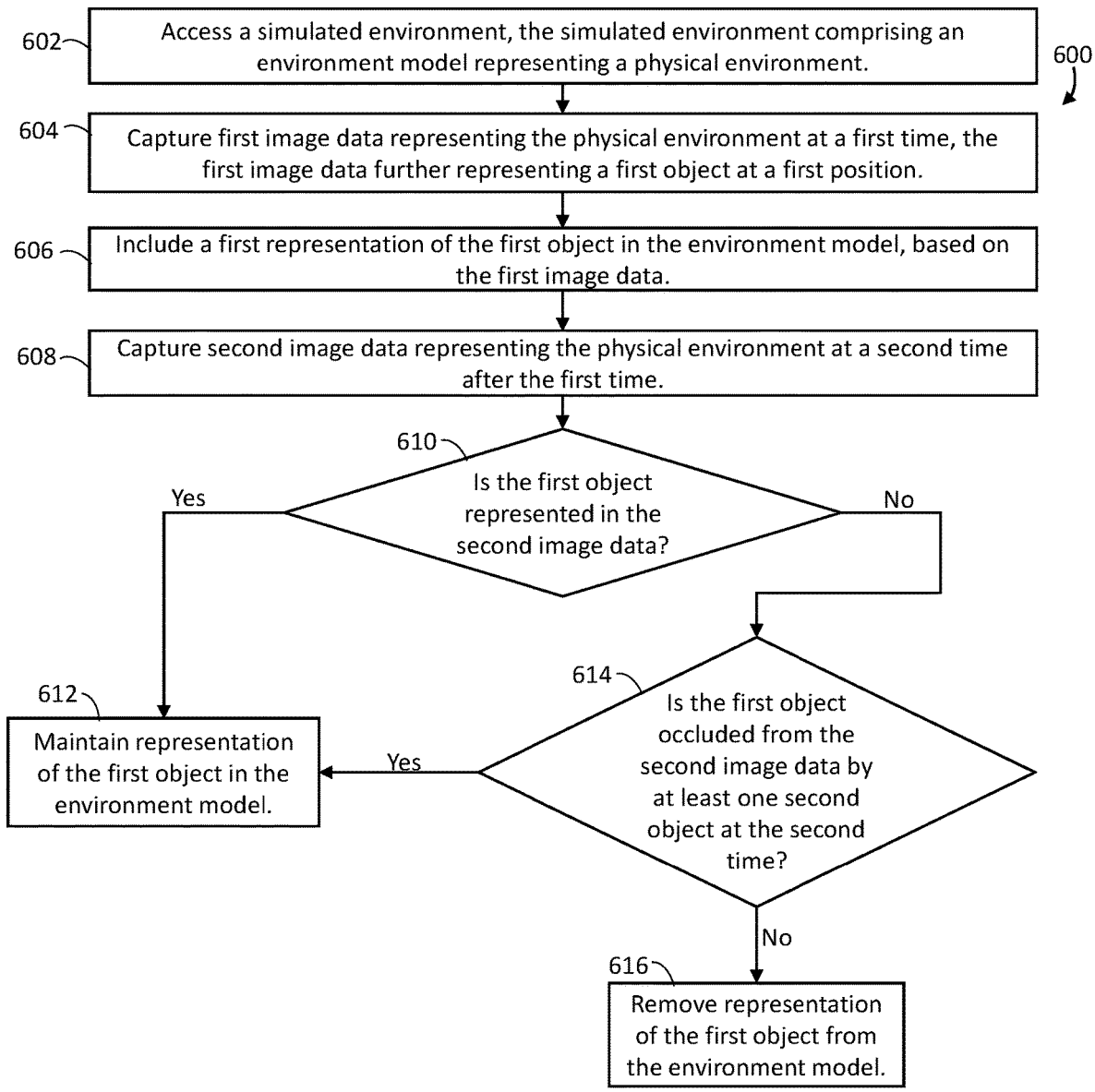
FIG. 6 is a flowchart diagram showing an exemplary method of managing a simulated environment in accordance with the present systems, methods, and computer program products.

FIG. 6 is a flowchart diagram showing an exemplary method 600 of managing a simulated environment, and in particular a method of implementing object permanence in a simulated environment. Method 600 could be implemented to manage a simulated environment in many different applications, such as augmented or virtual reality, video games, or robotics. The examples discussed herein particularly focus on robotics application, but the disclosure is also applicable to broader applications.

Method 600 pertains to operation of a system, which includes at least one processor and at least one image sensor. The system can also include at least one non-transitory processor-readable storage medium storing data (including, e.g., at least one environment model) and/or processor-executable instructions that, when executed by the at least one processor, cause the system to perform the method. In the exemplary implementations discussed hereafter, the system comprises a robot, which can include a robot body such as those illustrated in FIGS. 1, 2, and 3, and optionally can include a remote device such as that illustrated in FIG. 3. Certain acts of a method of operation of a robot system may be performed by at least one processor or processing unit (hereafter "processor") positioned at the robot body, and communicatively coupled to a non-transitory processor-readable storage medium positioned at the robot body. In some implementations, certain acts of a method of operation of a robot system may be performed by peripheral components of the robot body that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on as discussed above with reference to FIGS. 1, 2, and 3. The robot body may communicate, via communications and networking hardware communicatively coupled to the robot body's at least one processor, with remote systems and/or remote non-transitory processor-readable storage media, as discussed above with reference to FIG. 3. Thus, unless the specific context requires otherwise, references to a robot system's processor, non-transitory processor-readable storage medium, as well as data and/or processor-executable instructions stored in a non-transitory processor-readable storage medium, are not intended to be limiting as to the physical location of the processor or non-transitory processor-readable storage medium in relation to the robot body and the rest of the robot hardware. In other words, a robot system's processor or non-transitory processor-readable storage medium may include processors or non-transitory processor-readable storage media located on-board the robot body and/or non-transitory processor-readable storage media located remotely from the robot body, unless the specific context requires otherwise. Further, a method of operation of a system such as method 600 (or any of the other methods discussed herein) can be implemented as a computer program product. Such a computer program product comprises processor-executable instructions or data that, when the computer program product is stored on a non-transitory processor-readable storage medium of the system, and the computer program product is executed by at least one processor of the system, the computer program product (or the processor-executable instructions or data thereof) cause the system to perform acts of the method.

Returning to FIG. 6, method 600 as illustrated includes acts 602, 604, 606, 608, 610, 612, 614, and 616, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 602, a simulated environment is accessed, where the simulated environment comprises and environment model representing a physical environment. As an example, the physical environment could be such as environment 510 illustrated in FIG. 5A, and the environment model could be a model of the physical environment such as environment model 520 illustrated in FIG. 5B. In some implementations, the environment model could be stored on a non-transitory processor-readable medium at a robot body, and be accessed by at least one processor of the robot body. In other implementations, the environment model could be stored remotely from the robot body (e.g. at a server or other remote device), and could be accessed via a communication interface between the robot body and the remote device. Sensor data, such as image data or haptic data, can be gathered by at least one sensor at the robot body, for generation of the environment model which is comprised in the simulated environment accessed at 602. In some implementations, the act of "accessing" in and of itself could comprise generation of the environment model, whereas in other implementations, the environment model can be generated in advance of the accessing. In some implementations, sensor data is gathered by at least one sensor of another device or another robot body operable in the environment, for generation of the environment model in the simulated environment, and the at least one processor of the originally discussed robot body or robot system accesses said environment model in the simulated environment at 602.

At 604, first image data is captured by an image sensor of the system (e.g. an image sensor at the robot body). The first image data represents the physical environment at a first time, and in particular represents a first object in the physical environment at a first position. With reference to the example of FIG. 5A, the first object could be, for example, brush 515, and image data captured by an image sensor of robot body 590 includes a representation of brush 515 positioned on table 514.

A position of an object in a physical environment, as discussed herein, can refer to the position of the object relative to a robot body in the physical environment, can refer to the position of the object relative to at least one other object or static point in the physical environment, or can refer to the position of the object based on positional standards (such as GPS coordinates, or environment specific coordinates based on landmarks in the physical environment, as non-limiting examples). A position of an object in an environment model, as discussed herein, can similarly refer to the position of the object relative to a representation of a robot body in the environment model, can refer to the position of the object relative to at least one other object or static point in the environment model, or can refer to the position of the object based on positional standards (such as a coordinate system for the environment model, as a non-limiting example).

At 606, a first representation of the first object is included in the environment model based on the first image data. In some implementations, act 606 entails populating the environment model with the first representation of the first object based on the first image data. With reference to the example of FIGS. 5A and 5B, at least one processor of the robot system can generate a first representation 525 of brush 515, for population of the environment model. In other implementations, act 606 entails first determining whether the environment model includes the first representation of the first object. If the environment model does include the first representation of the first object, act 606 entails preserving the first representation of the first object as included in the environment model. If the environment model does not include the first representation of the first object, act 606 entails populating the environment model with the first representation of the first object based on the first image data, similar to as discussed above. With reference to the example of FIGS. 5A and 5B, at least one processor at or in communication with robot body 590 determines whether environment model 520 includes a first representation 525 of brush 515. If representation 525 is already included in environment model 520, the existing representation is preserved. If a representation of brush 515 is not included in environment model 520, a new representation 525 is generated, with which environment model 520 is populated.

At 608, second image data is captured by an image sensor of the system (e.g. an image sensor at the robot body). The second image data represents the physical environment at a second time after the first time. The second image data represents a portion of the physical environment which includes the first position where the first object was positioned at the first time (and where the first object may still be positioned, if it has not moved).

At 610, a determination is made by the at least one processor of the system as to whether the first object is represented in the second image data. That is, the second image data is analyzed to determine whether the first object is detected therein. The extent to which the first object should be represented in the second image data for a positive determination at 610 can vary depending on implementation. As one example, the first object could be considered as not represented in the second image data at 610 if the first object is not fully represented in the second image data (i.e. a full view of at least one orientation of the first object is not visible in the second image data). As another example, the first object may only be considered as not represented in the second image data at 610 if every part of the first object is not represented in the second image data (i.e. if the first object is completely absent from the second image data). In yet another example, the first object may be considered as represented in the second image data at 610 if sufficient parts or features of the first object are visible to the extent that the presence of the first object in the second image data can be determined (e.g., by at least one feature detector and/or object recognition algorithm) with a sufficient degree of confidence.

If at 610 the first object is represented in the second image data, the method proceeds to 612, where representation of the first object is maintained in the environment model. In some cases, this means that the first representation of the first object in the environment model, as included at 606, is preserved in the environment model as it is. This is particularly useful in cases where the first object has not moved, shifted, reoriented, or changed. In some cases however, even though the first object is represented in the second image data, the position, orientation, shape, or some other aspect of the first object may have changed. In such cases, if said change is significant enough, maintaining representation of the first object in the environment model comprises updating the first representation of the first object in the environment model to a new representation, which reflects changes to the first object since the first time. Maintaining (including updating) representation of the first object in the environment model can be performed by the at least one processor of the system taking appropriate action where the at least one non-transitory processor-readable storage medium of the system stores the environment model including representation of the first object. For example, the at least one processor can determine whether any updates are necessary or appropriate to an existing representation of the first object, and generate an updated representation if needed or appropriate. The at least one non-transitory processor-readable storage medium of the system stores an existing representation of the first object if no updated representation is needed or appropriate, or the at least one non-transitory processor-readable storage medium of the system stores an updated representation of the first object if necessary or appropriate.

If at 610 the first object is not represented in the second image data, the method proceeds to 614, where a determination is made by the at least one processor of the system as to whether the first object is occluded from the second image data by at least one second object at the second time. As non-limiting examples, such occlusion could occur if the second object moves to be between an image sensor of the robot body and the first object at the second time, or if the robot body moves such that the second object is between an image sensor of the robot body and the first object at the second time. In this context, "occlusion" can refer to partial occlusion or full occlusion. As one example, the first object could be considered as "occluded" at 614 if any part of the first object is occluded from the second image data (i.e. if any partial occlusion of the first object occurs). As another example, the first object may be considered as "occluded" at 614 only if every part of the first object is occluded from the second image data (i.e. if complete occlusion of the first object occurs). In yet another example, the first object may be considered as occluded if sufficient parts or features of the first object are occluded to the extent that any or all of the position, orientation, and/or existence of the first object cannot be determined (e.g., by at least one feature detector and/or object recognition algorithm) based on the second image data.

If the first object is determined as occluded at 614, the method proceeds to 612, where representation of the first object is maintained in the environment model. Maintaining representation of the first object in the environment model based on a determination at 614 is similar to maintaining representation of the first object in the environment model based on a determination at 610 as discussed above. In cases where the first object is considered as "occluded", but sufficient features of the first object are represented in the second image data such that an orientation and/or position of the first object can be identified, the first representation of the first object as included at 606 is maintained (if the first object has not moved and/or if the first object has not reoriented), or representation of the first object is updated to a new representation of the first object at the second time (if the first object has moved or reoriented to a significant enough extent). In cases where the first object is considered as occluded, and features of the first object are not sufficiently represented in the second image data to identify a position and/or orientation of the first object, the first representation of the first object as included at 606 is maintained (the first object is assumed to be unchanged).

If the first object is determined as not occluded at 614, the method proceeds to 616, where representation of the first object is removed from the environment model. That is, if the second image data indicates an absence of the first object, where said absence is not due to occlusion by an intervening object, the first object is determined as having been removed, and representation of the first object is removed from the environment model accordingly. Removal of representation of the first object in the environment model can be performed for example by the at least one processor of the system instructing the at least one non-transitory processor-readable storage medium of the system to delete, deindex, or ignore data which indicates presence or position of the first object in the environment model. Data regarding the first object itself does not necessarily have to be removed (though it can be, if appropriate). For example, data regarding features of the first object can still be stored, but data indicating existence or position of the first object in the environment model can be removed. In this way, if the first object is later identified in the environment again, the retained data for the first object can be used, and assigned a position in the environment model based on where in the physical environment the first object is identified.

A threshold for determining "representation" of the first object at 610 and determining "occlusion" of the first object at 614 can be correlated, or can be independent, as is appropriate for a given application. In one example, if the first object is determined as not being represented in the second image data at 610 because the first object is not completely represented in the second image data, determination of occlusion may have a low threshold, such that the first object is determined as being occluded from the second image data at 614 if any partial occlusion of the first object is determined. As a contrasting example, if the first object is determined as not being represented in the second image data at 610 because the first object is not completely represented in the second image data, determination of occlusion may have a high threshold, such that a sufficient portion of the first object must be considered as occluded by the second object at 614 to the extent that the first object cannot be identified in the second image data. In this way, the test for occlusion is applied strictly at 614, to remove the first object from the environment model at 616 if it cannot affirmatively be determined that the first object is not represented at 610 as a result of occlusion determined at 614.

As mentioned earlier, acts of method 600 can be performed by components of a system which are included at a robot body of the system, or by components of the system which are remote from the robot body of the system (e.g. included on a remote device of the system). For example, acts performed by at least one processor of the system can be performed by a processor at the robot body or a processor at the remote device. Likewise, data (such as the environment model) can be stored at a non-transitory processor-readable storage medium at the robot body, or a non-transitory processor-readable storage medium at the remote device. Further, the acts of method 600 do not have to performed exclusively by components at the robot body or components at the remote device. Rather, some acts can be performed by components at the robot body, and some acts can be performed by components at the remote device, within a given implementation. In one non-limiting exemplary implementation, acts 604, 608, 610, and 614 are performed by respective components at the robot body, whereas acts 602, 606, 612, and 616 are performed by respective components at the remote device. In another non-limiting exemplary implementation, acts 604 and 608 are performed by respective components at the robot body, whereas acts 602, 606, 610, 612, 614, and 616 are performed by respective components at the remote device. In yet another non-limiting exemplary implementation, all of acts 602, 604, 606, 608, 610, 612, 614, and 616 are performed by respective components at the robot body. Any appropriate data can be transmitted between the robot body and the remote device, by at least one communication interface as described with reference to FIG. 3, to enable the robot body and the remote device to perform desired acts.

Figure 7:
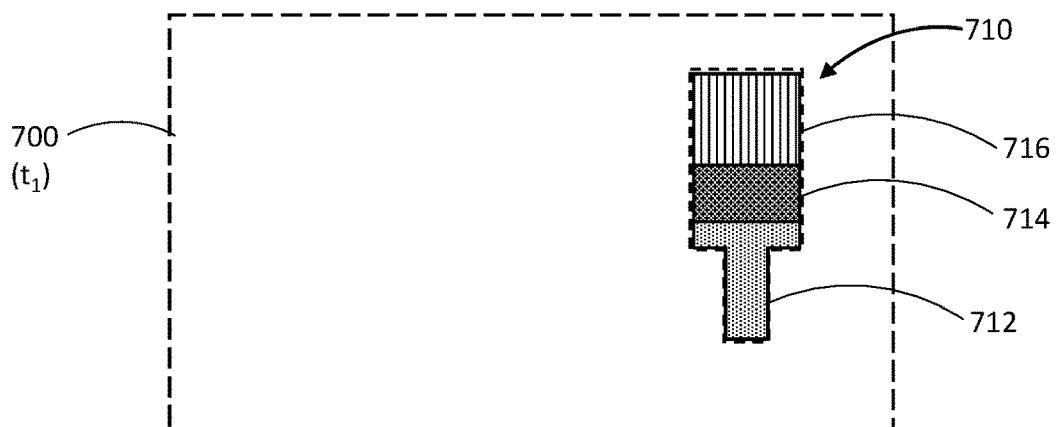
FIGS. 7, 8, 9, 10, 11, 12, and 13 are respective scene views which illustrate image data of exemplary scenarios at respective times in accordance with the present systems, methods, and computer program products.
Figure 8:
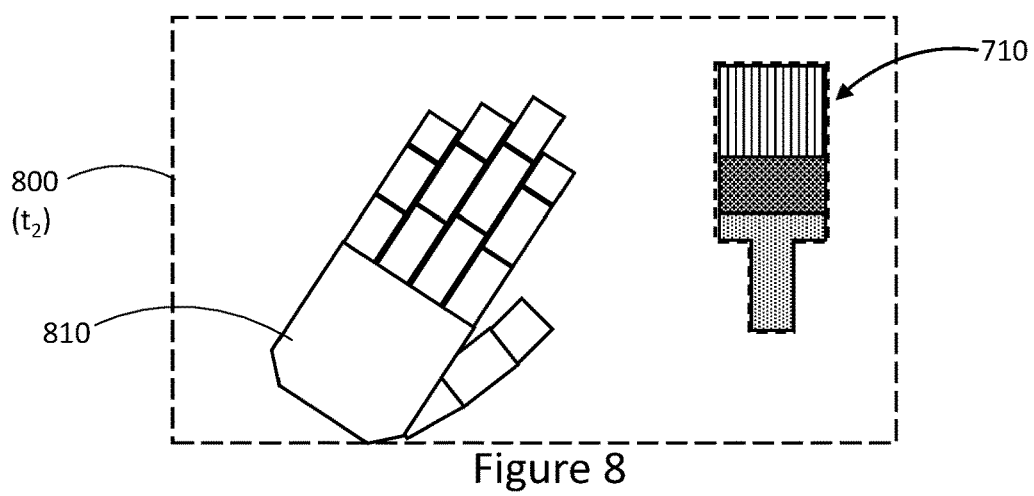
Figure 9:
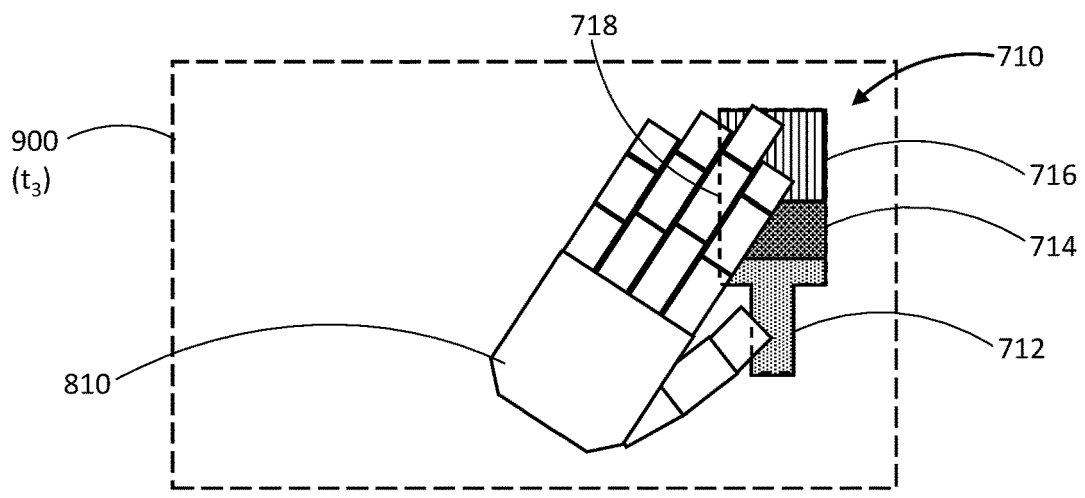
Figure 10:
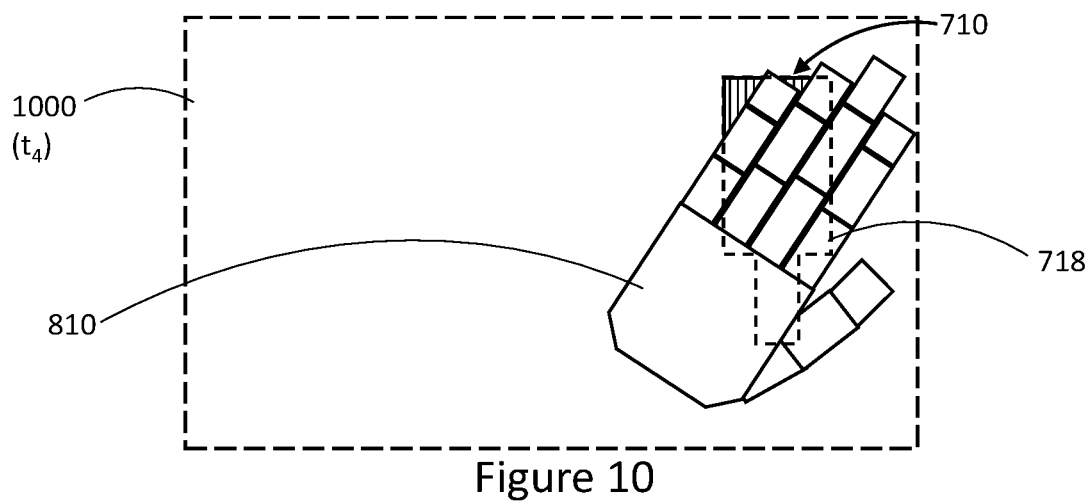
Figure 11:
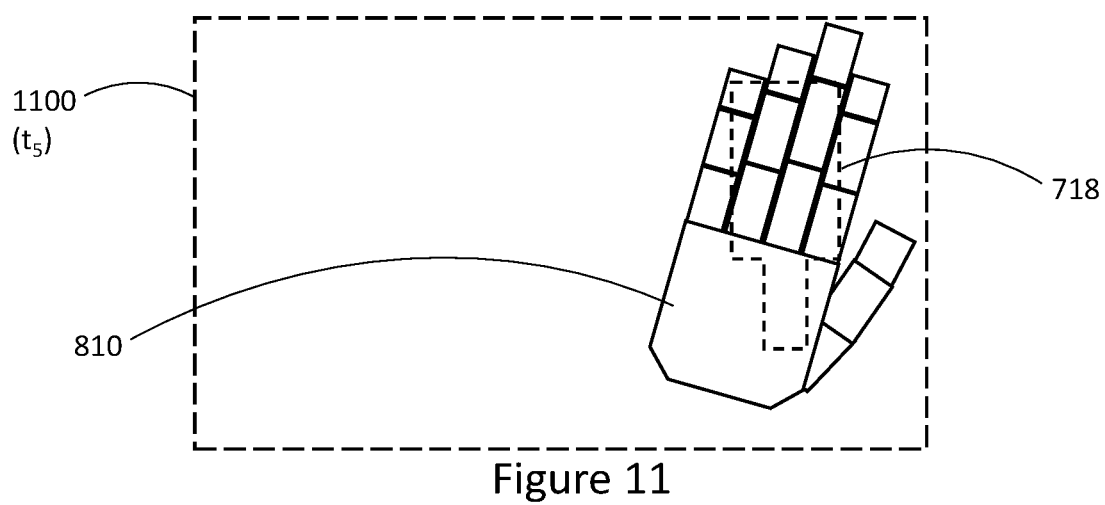
Figure 12:
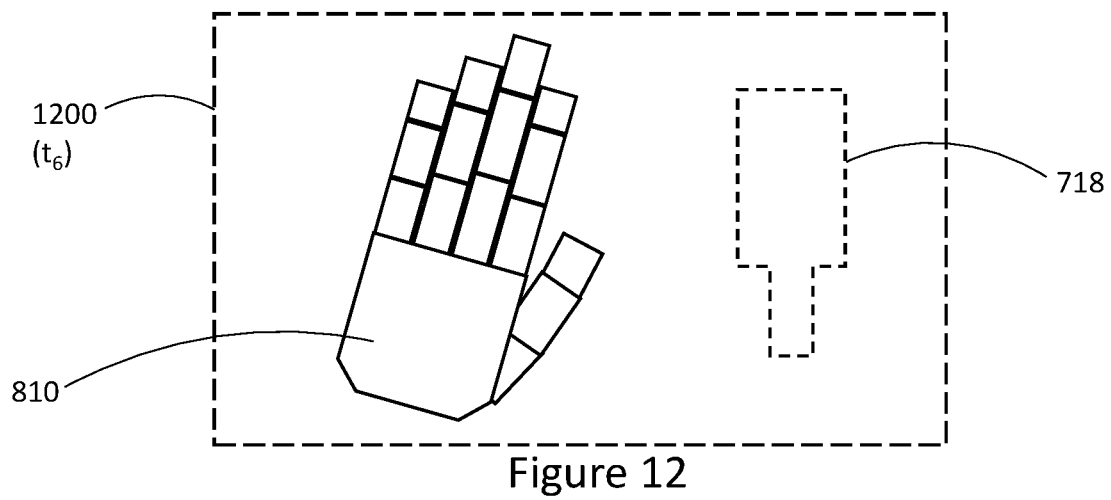
Figure 13:
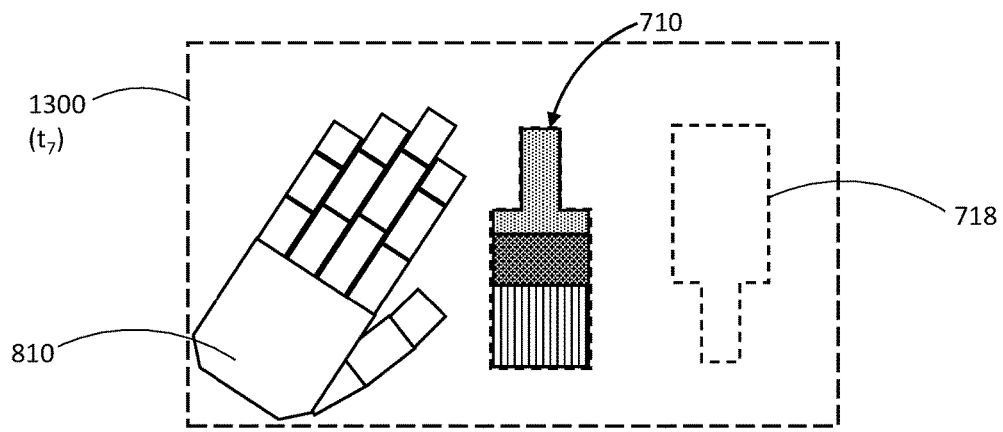

FIGS. 7, 8, 9, 10, 11, 12, 13 and 14 are scene views, which illustrate image data in exemplary scenarios at respective times. In particular, the "image data" as illustrated corresponds to what at least one image sensor captures (i.e., what a robot body sees) at a respective time. FIG. 7 illustrates image data 700 at a time $t_1$. FIG. 8 illustrates image data 800 at a time $t_2$. FIG. 9 illustrates image data 900 at a time $t_3$. FIG. 10 illustrates image data 1000 at a time $t_4$. FIG. 11 illustrates image data 1100 at a time $t_5$. FIG. 12 illustrates image data 1200 at a time $t_6$. FIG. 13 illustrates image data 1300 at a time $t_7$. As appropriate, times $t_1$, $t_2$, $t_3$, $t_4$, $t_5$, $t_6$, and $t_7$ can correspond to any of the "first time", "second time", "third time", or other time discussed with reference to any of the methods herein, including method 600 discussed above with reference to FIG. 6, and method 1400 discussed later with reference to FIG. 14. "First time", "second time", and "third time" are not necessarily in sequential order, as exemplified later in the discussion of FIG. 14. Additionally, FIGS. 7, 8, 9, 10, 11, 12, and 13 also illustrate how objects can be populated or represented in an environment model, as viewed from the perspective of the at least one image sensor which captures the respective image data in each Figure.

The discussion below presents examples of how method 600 in FIG. 6 is implemented or applied in the illustrated exemplary scenarios. These scenarios are illustrative examples, and are not limiting as to the application of method 600.

In FIG. 7, image data 700 at time $t_1$ includes a representation of brush 710. Brush 710 can be identified by at least one processor (e.g. by running at least one image classifier, feature detector, and/or object recognition algorithm on captured image data), based on any appropriate features of brush 710. For example, brush 710 could be identified by a shape thereof. Additionally, FIG. 7 illustrates handle 712, metal band 714, and bristles 716, which could be used in the identification of brush 710. Other features of brush 710, such as color or tone, could also be used to identify brush 710. Any number of features, alone or in combination, can be used to identify brush 710.

In the discussed examples, brush 710 corresponds to the "first object" described in method 600 above with reference to FIG. 6. Further, FIG. 7 shows a dotted outline of brush 710, which illustrates how brush 710 is represented in an environment model representing the scene of FIG. 7. This dotted line is not labelled in FIG. 7, because it substantially overlaps with an outline of brush 710. However, in later Figures (FIGS. 9, 10, 11, 12, and 13) where brush 710 is at least partially occluded, the representation of brush 710 in the corresponding environment model is labelled as 718.

In FIG. 8, image data 800 at time $t_2$ includes a representation of brush 710. Additionally, image data 800 includes a representation of an end effector 810, which is positioned within view of the at least one image sensor. In the discussed examples of FIGS. 8, 9, 10, 11, 12, and 13, end effector 810 corresponds to the "second object" described in method 600 above with reference to FIG. 6. In the examples, end effector 810 is illustrated without detailed connection to a robot body, to reduce clutter. Any appropriate connection to a robot body can be implemented as appropriate for a given application.

In a first exemplary scenario, with reference to method 600, $t_1$ corresponds to the "first time" such that image data 700 corresponds to the "first image data", and $t_2$ corresponds to the "second time" such that image data 800 corresponds to the "second image data". In this scenario, brush 710 is fully visible in image data 800 in FIG. 8 (end effector 810 does not occlude any of brush 710). As such, at 610 the first object (brush 710) is determined as being represented in the second image data. As a result, method 600 will proceed to act 612, where representation of the first object (brush 710) is maintained in the environment model.

In FIG. 9, image data 900 at time $t_3$ includes a partial representation of brush 710 and a representation of an end effector 810, similarly to FIGS. 7 and 8.

In a second exemplary scenario, with reference to method 600, $t_1$ corresponds to the "first time" such that image data 700 corresponds to the "first image data", and $t_3$ corresponds to the "second time" such that image data 900 corresponds to the "second image data". In this scenario, brush 710 is partially visible in the image data 900 in FIG. 9 (end effector 810 occludes a small portion of brush 710). The representation 718 of brush 710 in the environment model illustrates the portion of brush 710 which is occluded by end effector 810 in image data 900. Image data 900 also shows features of brush 710 which can be identified, namely handle 712, metal band 714, and bristles 716.

In cases where determination of representation of the first object at 610 in method 600 requires that the first object be completely represented, at 610 the first object (brush 710) is determined as not being represented in the second image data, and so method 600 proceeds to act 614. At 614 of method 600, it is determined that brush 710 is occluded by end effector 810, because end effector 810 is positioned at least partially between the at least one image sensor and a position of brush 710.

In cases where determination of representation of the first object at 610 in method 600 only requires a portion of the first object to be represented, at 610 the first object (brush 710) is determined as being represented in the second image data (e.g. by at least partially identifying handle 712, metal band 714, bristles 716, or any other features of brush 710).

As a result of both cases, method 600 will proceed to act 612, where representation of the first object (brush 710) is maintained in the environment model.

In FIG. 10, image data 1000 at time $t_4$ includes a partial representation of brush 710 and a representation of an end effector 810, similarly to FIGS. 7, 8, and 9.

In a third exemplary scenario, with reference to method 600, $t_1$ corresponds to the "first time" such that image data 700 corresponds to the "first image data", and $t_4$ corresponds to the "second time" such that image data 1000 corresponds to the "second image data". In this scenario, brush 710 is partially visible in the image data 1000 in FIG. 10 (end effector 810 occludes a significant portion of brush 710). The representation 718 of brush 710 in the environment model illustrates the portion of brush 710 which is occluded by end effector 810 in image data 1000. In image data 1000, brush 710 is so occluded by end effector 810 such that features thereof cannot be identified. Since brush 710 cannot be identified, at 610 in method 600, the first object (brush 710) is determined as not being represented in the second image data. As a result, method 600 will proceed to act 614, where it is determined that brush 710 is occluded by end effector 810, because end effector 810 is positioned at least partially between the at least one image sensor and a position of brush 710. That is, the end effector 810 is determined as being between the at least one image sensor and the representation 718 of brush 710 in the environment model, which is where brush 710 is assumed to be positioned. As a result, method 600 will proceed to act 612, where representation of the first object (brush 710) is maintained in the environment model.

In FIG. 11, image data 1100 at time $t_5$ includes a representation of an end effector 810, similarly to FIGS. 7, 8, 9, and 10.

In a fourth exemplary scenario, with reference to method 600, $t_1$ corresponds to the "first time" such that image data 700 corresponds to the "first image data", and $t_5$ corresponds to the "second time" such that image data 1100 corresponds to the "second image data". In this scenario, brush 710 is not visible in the image data 1100 in FIG. 11 (end effector 810 occludes the entirety of brush 710). The representation 718 of brush 710 in the environment model illustrates a position of brush 710 as occluded by end effector 810 in image data 1100. Since brush 710 is completely not visible, it cannot be identified, and at 610 in method 600, the first object (brush 710) is determined as not being represented in the second image data. As a result, method 600 will proceed to act 614, where it is determined that brush 710 is occluded by end effector 810, because end effector 810 is positioned between the at least one image sensor and brush 710. That is, the end effector 810 is determined as being between the at least one image sensor and the representation 718 of brush 710 in the environment model, where brush 710 is assumed to be positioned. As a result, method 600 will proceed to act 612, where representation of the first object (brush 710) is maintained in the environment model.

In FIGS. 10 and 11, even though brush 710 is not identified in the respective image data 1000 or 1100, brush 710 is assumed to still be present, but just occluded by end effector 810, and thus representation 718 of brush 710 is maintained in the environment model. That is, a position where brush 710 is expected to be is occluded, and thus this position has not been observed without brush 710 at said position. Since there is no confirmation that brush 710 is not present at the position (due to occlusion of the position), brush 710 is assumed to be present until such confirmation is obtained. To summarize, brush 710 is assumed to be present unless observed otherwise, and thus a representation 718 of brush 710 is maintained in the environment model unless evidence confirms that representation 718 should be removed.

As mentioned above with reference to FIGS. 5A and 5B, objects can be stored in the environment model based on coordinates. Objects in the environment model can be assumed to be at their stored coordinates until/unless the coordinates are observed with the respective object not being there (accounting for occlusion of the coordinates). An occluding object (e.g. end effector 810 in FIGS. 8, 9, 10, 11, 12, and 13) also has corresponding coordinates in the environment model. A projection (a vector or line) can be mapped from an image sensor to coordinates of a representation of the first object (e.g. representation 718 of brush 710) in the environment model, and if the projection collides with a representation of a second object (e.g. end effector 810) between the image sensor and the representation of the first object, the second object is determined as occluding the first object. Further, a plurality of projections, or a projection area, can be projected from the image sensor to different features of the representation of the first object, and a degree of occlusion of the first object can be determined based on how many of these projections or what extent of the projected area collides with the representation of the second object.

In FIG. 12, image data 1200 at time $t_6$ includes a representation of an end effector 810, similarly to FIGS. 7, 8, 9, 10, and 11.

In a fifth exemplary scenario, with reference to method 600, $t_1$ corresponds to the "first time" such that image data 700 corresponds to the "first image data", and $t_6$ corresponds to the "second time" such that image data 1200 corresponds to the "second image data". In this scenario, brush 710 is not visible in the image data 1200 in FIG. 12. The representation 718 of brush 710 in the environment model illustrates where brush 710 is expected to be, but brush 710 is not there. For example, brush 710 could have been moved since time $t_1$. Since brush 710 is not represented in image data 1200 at 610 in method 600, method 600 will proceed to act 614, where it is determined that brush 710 is not occluded by end effector 810, because end effector 810 is not positioned between the at least one image sensor and the representation 718 of brush 710 in the environment model. As a result, method 600 will proceed to act 616, where representation 718 of the first object (brush 710) is removed from the environment model.

In FIG. 13, image data 1300 at time $t_7$ includes a representation of brush 710 and a representation of an end effector 810, similarly to FIGS. 7, 8, 9, 10, 11, and 12.

In a sixth exemplary scenario, with reference to method 600, $t_1$ corresponds to the "first time" such that image data 700 corresponds to the "first image data", and $t_7$ corresponds to the "second time" such that image data 1300 corresponds to the "second image data". In this scenario, brush 710 is visible in the image data 1300 in FIG. 13, albeit in a different position and orientation than the image data 700 in FIG. 7. At 610 in method 600, the first object (brush 710) is determined as being represented in the second image data. As a result, method 600 will proceed to act 612, where representation of the first object (brush 710) is maintained in the environment model. In this sixth exemplary scenario, maintaining representation of the first object in the environment model entails updating the representation of the first object in the environment model to reflect the position and orientation of brush 710 in the image data 1300. In particular, FIG. 13 shows representation 718 of brush 710 prior to act 612 in method 600 (that is, the representation of brush 710 prior to updating the representation in the environment model). At 612, representation of brush 710 is maintained in the environment model, but is updated to reflect the position and orientation of brush 710 in the environment model, as shown by the dashed outline in FIG. 13 which corresponds to the position of brush 710.

Figure 14:
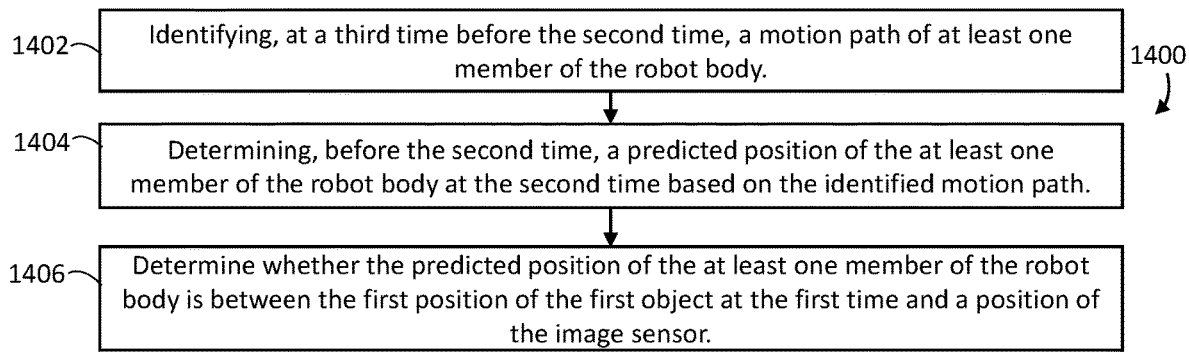
FIG. 14 is a flowchart diagram showing an exemplary method of determining occlusion of an object in accordance with the present systems, methods, and computer program products.

FIG. 14 is a flowchart diagram showing an exemplary method 1400 of determining occlusion of an object. Method 1400 can be implemented as act 614 in method 600, and thus can be implemented in similar contexts and with similar hardware as discussed earlier regarding method 600.

At 1402, at least one processor identifies, at a third time before the second time in method 600, a motion path of at least one member of the robot body. As a specific example scenario, with reference to FIGS. 8, 9, and 10: time $t_2$ in FIG. 8 is the first time in method 600, time $t_4$ in FIG. 10 is the second time in method 600, and time $t_3$ in FIG. 9 is the third time in method 1400. In this example scenario, the at least one processor identifies a motion path of end effector 810. In particular, end effector 810 has a motion path in which end effector 810 moves to significantly occlude brush 710.

In some implementations, identifying the motion path of the at least one member of the robot body is performed by simulating, by the at least one processor, a trajectory of the at least one member of the robot body based on speed and direction of travel of the at least one member of the robot body. In some implementations, speed and direction of travel of the at least one member of the robot body are identified based on haptic data collected by at least one haptic sensor carried by the robot body. For example, the at least one processor can identify speed and direction of travel based on forces applied to at least one joint of the robot body. In other implementations, speed and direction of travel of the at least one member of the robot body are identified based on image data from the at least one image sensor. In the discussed example, based on a difference in position between the end effector 810 in image data 800 and in image data 900 in FIG. 9, a direction of travel and a distance of travel of end effector 810 can be determined. Based on the distance of travel of end effector 810, and a difference in time between $t_2$ and $t_3$, speed of travel of the end effector can be determined. In yet other implementations, the motion path of the at least one member is determined based on at least one motion instruction upon which movement of the at least one member of the robot body is based. In the discussed example, motion of end effector 810 can be initiated in response to an instruction or other control data; from this instruction or control data, the motion path of the end effector can be determined or identified.

At 1404, the at least one processor determines a predicted position of the at least one member of the robot body at the second time based on the identified motion path. In the above discussed examples, based on the motion path (how the end effector is moving or is going to move), a future position of the end effector is determined. As a non-limiting example, where the determined motion path includes speed and direction of travel of the at least one member of the robot body, a future position of the at least one member can be predicted after a specified amount of time, by extrapolating motion of the member in the determined direction, at the determined speed, for the specified amount of time.

At 1406, the at least one processor determines whether the predicted position of the at least one member of the robot body is between the first position of the first object at the first time and a position of the image sensor. That is, in the above discussed examples, based on the predicted position of the end effector, it is determined whether the end effector is going to be positioned between the first object and the at least one image sensor, and whether the end effector is going to occlude the first object (and optionally, to what extent the end effector is going to occlude the first object).

Similar to as discussed with reference to method 600 in FIG. 6, acts of method 1400 can be performed by components of a system which are included at a robot body of the system, or by components of the system which are remote from the robot body of the system (e.g. included on a remote device of the system). For example, acts 1402, 1404, and 1406 can be performed by a processor at the robot body or a processor at the remote device. Any appropriate data can be transmitted between the robot body and the remote device, by at least one communication interface as described with reference to FIG. 3, to enable the robot body and/or the remote device to perform the acts of method 1400.

The robot systems described herein may, in some implementations, employ any of the teachings of U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-

0170607 A1), U.S. patent application Ser. No. 17/158,244 (Publication No. US 2021-0234997 A1), Publication No. US 2021-0307170 A1, and/or U.S. patent application Ser. No. 17/386,877, as well as US Provisional Patent Application Ser. No. 63/151,044, U.S. patent application Ser. No. 17/719,110, U.S. patent application Ser. No. 17/737,072, U.S. patent application Ser. No. 17/846,243, U.S. patent application Ser. No. 17/566,589, U.S. patent application Ser. No. 17/962,365, U.S. patent application Ser. No. 18/089,155, U.S. patent application Ser. No. 18/089,517, U.S. patent application Ser. No. 17/985,215, U.S. patent application Ser. No. 17/883,737, U.S. Provisional Patent Application Ser. No. 63/441,897, U.S. Provisional patent Application Ser. No. 63/524,507, and/or U.S. patent application Ser. No. 18/117,205, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present robots, robot systems and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of implementing object permanence in a simulated environment, the method comprising:
    accessing, by at least one processor, the simulated environment, wherein the simulated environment comprises an environment model representing a physical environment;
    capturing, by at least one image sensor, first image data representing the physical environment at a first time, the first image data further representing a first object at a first position in the physical environment and a second object at a second position in the physical environment;
    detecting, by the at least one processor, a plurality of features of the first object in the first image data;
    identifying, by the at least one processor, the first object in the first image data based on the plurality of detected features of the first object in the first image data;
    detecting, by the at least one processor, at least one feature of the second object in the first image data;
    identifying, by the at least one processor, the second object in the first image data based on the at least one detected features of the second object in the first image data;
    including, based on the first image data, a first representation of the first object at a first position in the environment model and a second representation of the second object at a second position in the environment model;
    capturing, by the at least one image sensor, second image data representing the physical environment at a second time after the first time, the second image data further representing the first object at the first position in the physical environment and the second object at a third position in the physical environment;
detecting, by the at least one processor, at least one feature of the second object in the second image data;
identifying, by the at least one processor, the second object in the second image data based on the at least one detected feature of the second object in the second image data;
determining, by the at least one processor, that the second object has moved to the third position in the physical environment in the second image data;
updating representation of the second object to a third position in the environment model;
detecting, by the at least one processor, a subset of the plurality of features of the first object in the second image data;
identifying, by the at least one processor, the first object in the second image data based on the subset of detected features of the first object in the second image data;
determining, by the at least one processor, that the first object remains positioned at the first position in the physical environment in the second image data;
maintaining representation of the first object at the first position in the environment model;
capturing, by the at least one image sensor, third image data representing the physical environment at a third time after the second time, the third image data further representing the second object at a fourth position in the physical environment;
detecting, by the at least one processor, at least one feature of the second object in the third image data;
identifying, by the at least one processor, the second object in the third image data based on the at least one detected feature of the second object in the third image data;
determining, by the at least one processor, that the second object has moved to the fourth position in the physical environment in the third image data;
updating representation of the second object to a fourth position in the environment model;
determining, by the at least one processor, that the first object is not detectable in the third image data;
determining, by the at least one processor, that the first position is occluded by the second object at the fourth position; and
maintaining representation of the first object at the first position in the environment model without visually rendering the first object.

2. The method of claim 1 wherein including, based on the first image data, the first representation of the first object at the first position in the environment model comprises:
populating, by the at least one processor, the environment model with the first representation of the first object at the first position based on the first image data.

3. The method of claim 1 wherein including, based on the first image data, the first representation of the first object at the first position based on the first image data comprises:
determining, by the at least one processor, that the environment model includes the first representation of the first object at the first position; and
preserving the first representation of the first object at the first position as included in the environment model.

4. The method of claim 1 wherein determining, by the at least one processor, that the first position is occluded by the second object at the fourth position comprises:

determining, by the at least one processor, that the fourth position of the second object is between the first position of the first object and a position of the image sensor.

5. The method of claim 1, wherein the at least one image sensor is carried by a robot body positioned in the physical environment.

6. The method of claim 5 wherein the second object includes a member of the robot body.

7. The method of claim 6 wherein the member of the robot body includes an end-effector of the robot body.

8. The method of claim 7 wherein the end-effector of the robot body includes a hand member of the robot body.

9. The method of claim 6, wherein determining, by the at least one processor, that the first position is occluded by the second object in the third image data comprises:
identifying, at a fourth time before the third time, a motion path of the member of the robot body;
determining, by the at least one processor before the third time, a predicted position of the member of the robot body at the third time based on the identified motion path; and
determining that the predicted position of the member of the robot body is between the first position of the first object time and a position of the image sensor.

10. The method of claim 9 wherein identifying the motion path of the member of the robot body comprises: identifying the motion path of the member of the robot body by simulating, by the at least one processor, a trajectory of the member of the robot body based on speed and direction of travel of the member of the robot body.

11. The method of claim 10 wherein the speed and direction of travel of the member of the robot body are identified based on haptic data captured by at least one haptic sensor carried by the robot body.

12. The method of claim 10 wherein the speed and direction of travel of the member of the robot body are identified based on image data from the at least one image sensor.

13. The method of claim 9 wherein identifying the motion path of the member of the robot body comprises: identifying the motion path of the member of the robot body based on at least one motion instruction upon which movement of the member of the robot body is based.

14. The method of claim 4 wherein determining, by the at least one processor, that the fourth position of the second object is between the first position of the first object and a position of the image sensor includes:
mapping, in the environment model and by the at least one processor, a projection from the image sensor to the first position in the environment model; and
determining, by the at least one processor, that the projection collides with the representation of the second object at the fourth position in the environment model.

15. The method of claim 14 wherein:
the image sensor corresponds to a first set of coordinates in the environment model;
the first position in the environment model corresponds to a second set of coordinates in the environment model;
the fourth position in the environment model corresponds to a third set of coordinates in the environment model;
mapping, in the environment model and by the at least one processor, the projection from the image sensor to the first position in the environment model includes mapping, in the environment model and by the at least one processor, the projection from the first set of coordinates in the environment model to the second set of coordinates in the environment model; and determining, by the at least one processor, that the projection collides with the representation of the second object at the fourth position in the environment model includes determining, by the at least one processor, that the projection passes through the third set of coordinates in the environment model in between the first set of coordinates in the environment model and the second set of coordinates in the environment model.

\* \* \* \* \*